United States Patent
Birch et al.

(10) Patent No.: US 9,056,411 B2
(45) Date of Patent: Jun. 16, 2015

(54) METHOD FOR FILLING HOLLOW CAVITIES WITH POLYMER FOAM

(75) Inventors: Adrian J. Birch, Kempraten-Jona (CH); Katja Oswald, Zurich (CH)

(73) Assignee: Dow Global Technologies LLC, Midland, MI (US)

( * ) Notice: Subject to any disclaimer, the term of this patent is extended or adjusted under 35 U.S.C. 154(b) by 347 days.

(21) Appl. No.: 13/556,268

(22) Filed: Jul. 24, 2012

(65) Prior Publication Data

US 2013/0026670 A1 Jan. 31, 2013

Related U.S. Application Data

(60) Provisional application No. 61/511,585, filed on Jul. 26, 2011.

(51) Int. Cl.
- B29C 44/00 (2006.01)
- B29C 44/18 (2006.01)
- B29C 44/12 (2006.01)
- C08J 9/00 (2006.01)

(52) U.S. Cl.
CPC ........... B29C 44/184 (2013.01); B29C 44/1214 (2013.01); C08J 9/0085 (2013.01); C08J 2375/04 (2013.01)

(58) Field of Classification Search
CPC ............................. B29C 67/20; B29C 44/184
USPC ......................................... 264/51, 45.1, 46.6
See application file for complete search history.

(56) References Cited

U.S. PATENT DOCUMENTS

| | | | |
|---|---|---|---|
| 3,310,615 A | 3/1967 | Bender | |
| 3,867,492 A | 2/1975 | Drostholm | |
| 4,269,890 A | 5/1981 | Breitling | |
| 4,303,728 A * | 12/1981 | Houdek et al. | 428/319.7 |
| 7,011,315 B2 | 3/2006 | Czaplicki | |
| 7,169,344 B2 | 1/2007 | Coon | |
| 7,341,317 B2 | 3/2008 | Platner | |
| 7,469,459 B2 * | 12/2008 | Kosal et al. | 29/455.1 |
| 2003/0209921 A1 * | 11/2003 | Coon et al. | 296/187.02 |

FOREIGN PATENT DOCUMENTS

| | | |
|---|---|---|
| EP | 1426273 B | 5/1988 |
| WO | 2002-079340 A | 10/2002 |
| WO | 2005-028178 A | 3/2005 |
| WO | 2005-090431 A | 9/2005 |
| WO | 2006-098745 A | 9/2006 |
| WO | 2006-107342 A | 10/2006 |
| WO | 2007-040617 A | 4/2007 |

* cited by examiner

*Primary Examiner* — Galen Hauth
(74) *Attorney, Agent, or Firm* — Gary C Cohn PLLC

(57) ABSTRACT

Cavities are partially or entirely filled with a polymer foam. A flexible, porous mesh tube is introduced into the cavity. The mesh tube has a volume smaller than that of the cavity and has openings. A foamable liquid mixture is introduced into the mesh tube. Despite the presence of the openings, the foamable liquid mixture does not pass through the openings in the mesh tube. The captured liquid composition then expands. As the composition expands, it flows through the openings in the mesh tube and makes contact with the walls of the cavity. After curing, a polymer foam is obtained which adheres to the cavity walls.

15 Claims, 2 Drawing Sheets

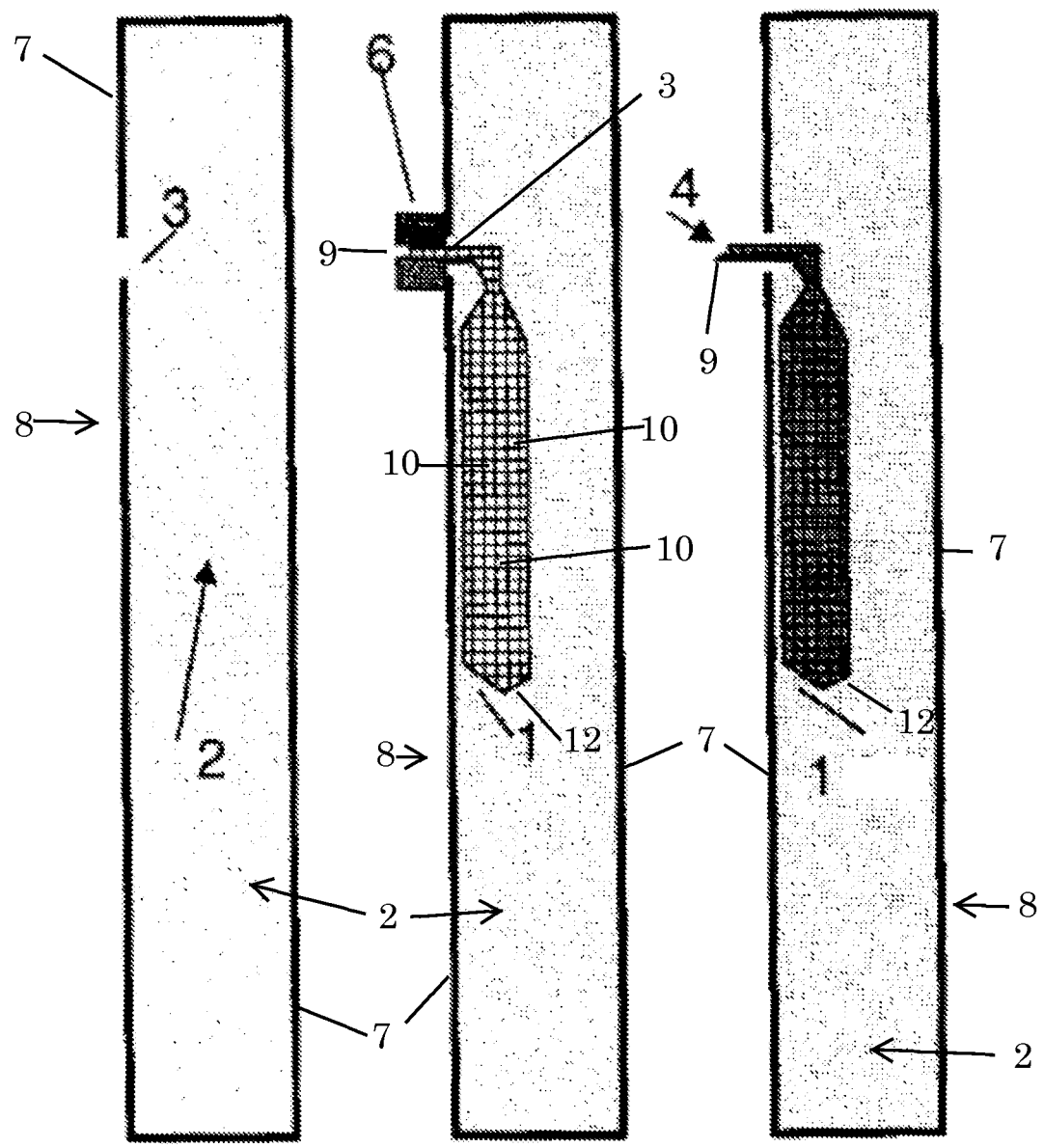

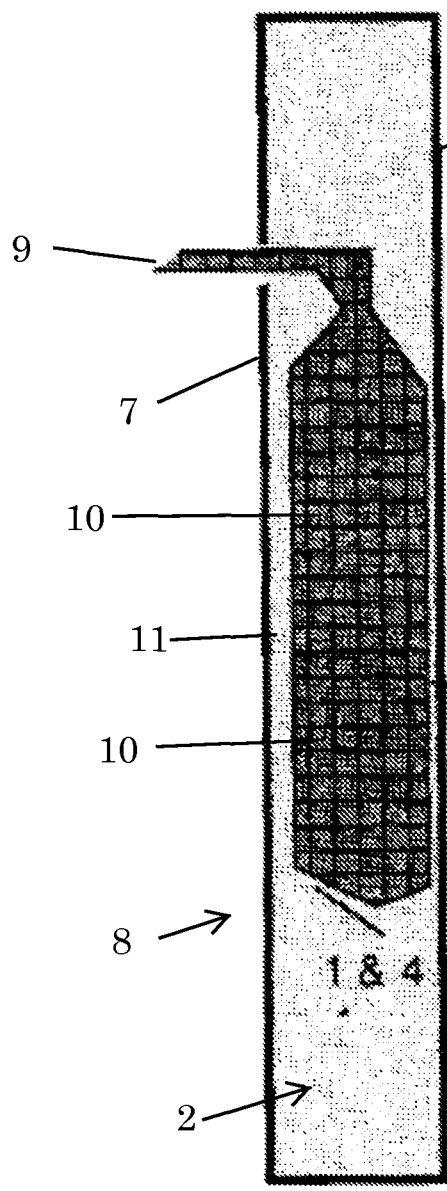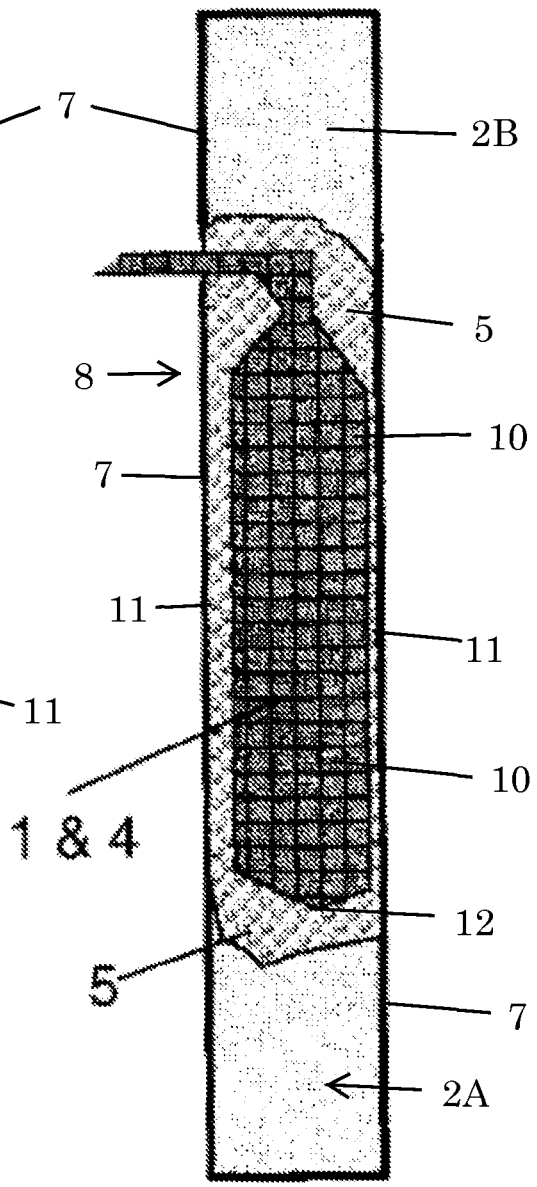

METHOD FOR FILLING HOLLOW CAVITIES WITH POLYMER FOAM

This application claims priority from U.S. Provisional Patent Application No. 61/511,585, filed 26 Jul. 2011.

The present invention relates to methods for filling hollow cavities with polymer foams.

Polymer foams are frequently used to fill hollow structures. These foams can be used, for example, to seal off a section of pipe, to prevent leakage or for other reasons. In the automotive industry, polymer foams are used for structural reinforcement, preventing corrosion and damping sound and vibration. In many cases, manufacturing is simplest and least expensive if the foam can be formed in place where it is needed, rather than assembling a previously-foamed part to the rest of the structure. For this reason, a variety of types of foamable compositions have been developed. The formulation is inserted into a cavity where the foam is needed, and expanded in place to fill at least a portion of the cavity.

Various types of expandable polymer systems have been used in these applications. These polymer systems differ in the types of polymers that they contain, and in their physical form. Among the polymers that can be used are polyurethanes, epoxies and various polyolefin compositions. The polyurethanes are most typically supplied in the form of a liquid mixture of precursors that cure and expand in the cavity to produce the foam. Most expandable epoxy resin formulations and all expandable polyolefin compositions, on the other hand, are solid materials that must be heated to some elevated temperature at which the composition softens enough to expand under the action of some blowing agent.

The liquid types and the solid types each have advantages in certain manufacturing situations. Solid types are often used when the cavity cannot hold a liquid. Another advantage of the solid types is that they often can be held or affixed in a specific location within a cavity, and can be expanded to provide localized sealing or reinforcement in only a portion of the cavity. The solid types have several disadvantages. Manual labor is often needed to position the solid types within the cavity and in many cases to affix them into place within the cavity. The solid types often require some sort of carrier or holder, which adds significantly to the expense and complexity of the part. In many cases, the overall manufacturing process is such that there is no convenient point for inserting a solid expandable composition into the cavity. To expand the solid types, they need to be heated to temperatures that often exceed 80° C. and may reach as much as 120-160° C. This may not be possible in all cases, due to limitations of the materials of construction and/or constraints imposed by particular manufacturing processes.

The liquid types, and the polyurethane types in particular, have the advantage of being easy handled. The liquid components can be metered and pumped into the cavity using automated equipment. The cavity-filling step is easily incorporated into many manufacturing processes. In addition, it is often unnecessary to heat the liquid types in order to expand them, because many of the liquid types expand and cure exothermically. If heat is needed to drive the expansion and curing reactions, it often can be provided by preheating the components before they are introduced into the cavity. For this reason, it is often possible to avoid a separate heating step when using foamable liquid mixtures.

The main disadvantages of the liquid types are that they are difficult to use when the cavity is incapable of holding a liquid, or when the cavity is not to be completely filled. Partial cavity filling is useful in many circumstances. For example, adequate performance can be achieved in some instances by filling only a portion of a cavity with the foam. It may be important in other cases to keep a portion of the cavity accessible for various reasons. In such cases, filling the entire cavity adds expense and weight but provides little additional benefit, and may even be detrimental.

It would be desirable to provide a simple and inexpensive method whereby an expandable liquid polymer composition could be used to fill cavities that are not capable of holding a liquid, or to only partially fill a cavity.

There have been attempts to solve this problem by fitting the cavity with a bag, and introducing the liquid polymer composition into the bag. The bag defines both the volume of the polymer foam and its position within the cavity. Examples of this approach are described in U.S. Pat. No. 3,310,615, WO 2006/098745 and EP 0 268 416. The problem with this approach is that the bag becomes interposed between the polymer foam and the walls of the cavity, and prevents the polymer foam from adhering to the cavity walls. This adhesion is often necessary for good performance. Without adequate adhesion, problems such as leaking, noise transmission or movement of the polymer foam within the cavity can occur. In EP 0 268 416, this problem is partially addressed by providing perforations in limited regions of the bag. This allows the expandable polymer composition to penetrate through the openings during the curing process, where it can contact the cavity walls and form an adhesive bond. The bag in this case has a larger cross-sectional area than the cavity. Because of the size of the bag, and its large size relative to the internal dimensions of the cavity, the ability of the expanding polymer to exit through the perforations is limited. Adhesion between the polymer foam and the cavity walls can occur only at limited areas. Because of this, adhesion is often incomplete or otherwise inadequate.

The present invention is a method of providing a polymer foam within a hollow cavity, comprising:

a) introducing a mesh tube at least partially into the cavity, the mesh tube being characterized in that (1) the volume of the mesh tube is smaller than the volume of the hollow cavity, (2) the mesh tube has an entrance for introducing a foamable liquid mixture containing at least one blowing agent and at least one organic polymer or organic polymer precursor into the mesh tube and (3) the mesh tube contains openings each having an area of from 0.01 $cm^2$ to 5 $cm^2$, which openings in the aggregate constitute at least 50% of the surface area of that portion of the mesh tube within the cavity;

b) then at least partially filling the mesh tube with the foamable liquid mixture, and then c) expanding the foamable liquid mixture such that the foamable liquid mixture expands and upon expansion at least a portion of the foamable liquid mixture flows through at least some of the openings in the mesh tube and into the hollow cavity and forms a polymeric foam adherent to at least one internal surface of the hollow cavity.

In certain embodiments, the initial volume of the foamable liquid mixture (i.e., the volume as of the time of completion of step b)) is smaller than that of the mesh tube (i.e., small than the holding capacity of the mesh tube), and the foamable liquid mixture is substantially captured by the mesh tube such that a portion of the hollow cavity remains unfilled after step b).

In certain embodiments, a portion of the hollow cavity remains unfilled after the completion of step c).

The process of the invention provides several advantages. Cavities that do not hold liquids are easily filled using the invention, despite the fact that the foamable mixture is introduced into the cavity as a liquid. Partial cavity filling is simply and inexpensively achieved when desired. In addition, the presence of the mesh tube has been found in some instances to contribute to the mechanical integrity of the polymer foam. In particular, cracking that sometimes develops when the polymer foam is exposed to thermal cycling is often reduced or eliminated due to the presence of the mesh tube in the filled part.

FIGS. 1A through 1E illustrate an embodiment of the process of the invention.

In FIG. 1A, hollow member 8 includes walls 7 that define internal cavity 2. Port 3 is provided in one of walls 7. In FIG. 1B, mesh tube 1 has been introduced into internal cavity 2 through port 3. In alternative embodiments, the mesh tube may be introduced into the cavity during the manufacturing or assembly process during which the cavity is made. This latter approach is especially useful when the mesh tube lacks flexibility or otherwise is difficult to introduce into the cavity once the cavity has been formed.

In the embodiment illustrated in FIG. 1B a distal end 12 of mesh tube 1 is closed off so that mesh tube 1 takes the form of a sack. The volume of mesh tube 1 (calculated as its cross-sectional area times length of a fully-filled tube) is less than that of cavity 2. In FIG. 1B, mesh tube 1 has a circular cross-section, but in other embodiments the mesh tube may have any convenient cross-sectional shape, including for example elliptical, square, rhombic, rectangular, other polygon, and the like, as may be adapted for the specific cavity.

Mesh tube 1 has entrance 9, which in the embodiment shown, extends out of port 3 to the exterior of hollow member 8 and is held in place via holder 6. In the embodiment shown in FIG. 1B, entrance 9 is located at one end of mesh tube 1. This is not required, however. Entrance 9 may be located at any convenient location along the length of the mesh tube. In addition, although mesh tube 1 in FIG. 1B is shown as being linear, it does not have to be. The mesh tube may be "Y"-shaped, curved, or have any other convenient shape as may be suitable for the particular cavity to be filled and a needed location of the entrance.

Mesh tube 1 also has multiple openings, some of which are indicated by reference numerals 10. In the embodiment shown, openings 10 extend over the entire surface of the mesh tube. Openings 10 in the aggregate constitute at least 50% of the surface area of the portion of mesh tube 1 within cavity 2. As shown in FIGS. 1C and 1D, foamable liquid mixture 4 is introduced into mesh tube 1 via entrance 9.

In the embodiment shown in FIGS. 1C and 1D, the initial volume of foamable liquid mixture 4 is less than or equal to the volume of mesh tube 1. In such cases, the initial volume of foamable liquid mixture 4 is preferably up to 80% of the volume of mesh tube 1 and more preferably up to 50% of the volume of mesh tube 1.

In the embodiment shown in FIGS. 1C and 1D, mesh tube 1 captures foamable liquid mixture 4, substantially preventing foamable liquid mixture 4 from escaping out of mesh tube 1 through openings 10 into other areas of cavity 2, and in such manner substantially capturing the foamable liquid mixture.

For purposes of this invention, the foamable liquid mixture is considered to be captured by the mesh tube if at least 90%, preferably at least 95%, of its initial volume is retained within the mesh tube.

The mesh tube in some alternative embodiments has at least one large (relative to the openings, preferably greater than 5 cm$^2$ in area) distal hole at an end of the mesh tube spaced apart from the entrance through which the foamable reaction mixture is introduced. Other than the optional presence of such distal hole(s), the mesh tube is preferably devoid of larger openings through which the foamable liquid mixture can pass through easily before it expands under the force of the blowing agent. If a distal hole is present in the mesh tube, it is possible that some portion of the foamable liquid mixture will pass out of the mesh tube through such distal hole during step b), and in such case the foamable liquid mixture may not be substantially captured by the mesh tube. If the initial volume of the foamable liquid mixture is small enough, it may be substantially captured by the mesh tube even when a distal hole is present, again leaving at least a portion of the cavity unfilled.

The foamable liquid mixture 4 introduced into mesh tube 1, then expands and as it expands comes to occupy the entire volume of mesh tube 1, as shown FIG. 1D. As discussed below, the processes that lead to this expansion may begin during or even before the filling step. As foamable liquid mixture 4 continues to expand, a portion of the expanding mixture flows through openings 10 in mesh tube 1 under the force of the expanding blowing agent and occupies spaces 11 between mesh tube 1 and walls 7. As a result of the expansion, foamable reaction mixture 4 forms polymer foam 5; a portion of polymer foam 5 adheres to walls 7, as shown in FIG. 1E. Depending on the particular polymer system employed, the expansion is typically accompanied by a curing and/or cooling of the organic polymer or organic polymer precursor(s) contained in the foamable reaction mixture to form a solid polymer foam.

During the expansion step, the foamable liquid mixture expands to form a polymer foam that preferably has a volume of at least 150% of its original, unexpanded volume. The foamable reaction mixture may expand to as much as 3500% of its original volume. In some cases, it may expand to 150 to 500%, or to 200 to 500% of its original volume. In other cases, it may expand to 500 to 3500%, or to 500 to 2000%, of its original volume. The density of the resulting polymer foam may be as much as about 640 kg/m$^3$ or as little as about 16 kg/m$^3$. In some cases, the polymer foam has a density of 160 to 640 kg/m$^3$ or 160 to 500 kg/m$^3$. These somewhat high densities are especially suitable in cases in which the foam is primarily present for mechanical reinforcement. In other case, such as when the foam is primarily present as an acoustical barrier or barrier to fluids, the foam density may be in the range of 16 to 160 kg/m$^3$, or 24 to 80 kg/m$^3$. The polymer foam may be open-celled, closed-celled, or partially open-celled and partially closed-celled. The polymer foam may be soft and flexible (as is the case for many acoustical foams) or somewhat rigid (as is the case of a structural foam that provides structural strength to the filled cavity).

The mesh tube defines a space having an entrance at one end through which the foamable reaction mixture can be introduced, and multiple openings distributed over all or part of its surface. These openings in the aggregate constitute at least 50% of the surface area of that portion of the mesh tube contained within the cavity, and may constitute any higher proportion of the surface area of the mesh tube, consistent with its mechanical integrity. The openings may constitute at least 60%, at least 70%, at least 80% or at least 90% of the surface area of that portion the mesh tube contained within the cavity. The openings in the mesh tube permit the foamable liquid mixture to escape as it expands under the force of the expanding blowing agent.

The openings (apart from a distal hole, if present) are small enough such that foamable liquid mixture does not pass through the openings when it is first introduced into the mesh tube and before it expands. The size of the openings is also such that the expanding foamable liquid mixture can escape through the openings as the mixture expands to a volume greater than that of the mesh tube. The areas of the individual openings may be as small as 0.01 cm$^2$ or as large as 5 cm$^2$.

Within this broad range, smaller openings are favored when the foamable reaction mixture has a low initial viscosity, and larger openings are favored when the foamable liquid mixture is has a higher initial viscosity. A preferred area for each of the individual openings is from 0.04 to 1 cm$^2$ or from 0.04 to 0.5 cm$^2$. It is not necessary that all of the openings have the same area.

The openings may be distributed over all of that portion of the surface of the mesh tube that is contained within the cavity, or only a portion thereof, provided that the openings in the aggregate constitute at least 50% of the surface area of the mesh tube. It is preferred that the openings are distributed over the entire surface of such portion of the mesh tube that is contained within the cavity.

The shape of the openings is not critical. The openings can be circular, elliptical, polygonal (triangular, square, rhombic, rectangular, pentagonal, hexagonal, octagonal etc.) star-shaped, or other convenient shape.

The volume of the mesh tube may be from about 5% to 95% of that of the cavity. In specific cases, the volume of the mesh tube may be from 5 to 75% or from 5 to 50% of that of the cavity. In other specific cases, the volume of the mesh tube may be from 50 to 90% or from 50 to 75% of that of the cavity.

The mesh tube may have a smaller cross-sectional area than the cavity, may be shorter than the cavity, or both. It is preferred that the mesh tube has a smaller cross-sectional area than the hollow cavity, or that it has both a smaller cross-sectional area and a shorter length than the hollow cavity. The cross-sectional area of the mesh tube may be, for example, from 10 to 95%, preferably from 25 to 75% or from 25 to 50% of that of the cavity.

When the cross-sectional area of the mesh tube is smaller than that of the cavity, a space will be defined between the mesh tube and at least one internal wall of the cavity, once the foamable liquid mixture has been introduced into the mesh tube but before it expands to a volume greater than that of the mesh tube. In FIG. 1D, such spaces are indicated by reference numerals 11. In such a case, such spaces typically become filled with polymer foam after the expansion step has taken place, as shown, for example, in FIG. 1E.

The mesh tube may have a length of up to 100% of that of the cavity. In some embodiments, the mesh tube is shorter than the cavity, as is the case in the embodiment shown in FIGS. 1A-1E. In those cases, the mesh tube may have a length that is, for example, from 5 to 95%, from 5 to 75% or from 5 to 50% of that of the cavity. When the mesh tube is shorter than the cavity, it is possible (and preferred) that portions of the cavity will remain unfilled after the expansion step has been completed, as shown, for example in FIG. 1E. As shown in FIGS. 1C-1D, the mesh tube may in such cases be closed at a distal end to better capture the foamable liquid mixture. In the embodiment shown in FIG. 1E, polymer foam 5 fills only a central section of cavity 2, leaving unfilled sections 2A and 2B remaining in the cavity. Alternatively, only a single section of the cavity may remain unfilled. The location and dimensions of unfilled sections of the cavity can be controlled in part by the location and size of the mesh tube (together with other factors such as the amount of foamable liquid mixture that is introduced and the amount by which it expands).

It is also within the scope of the invention to fill the entire cavity with the polymer foam.

The mesh tube in some embodiments is a net material, which can be made, for example, of a perforated film or woven, entangled or knitted fibers.

The material of construction of the mesh tube can vary widely. The mesh tube preferably does not dissolve in or react with the foamable liquid mixture or any component thereof under the conditions of the expansion step. The mesh tube preferably made of a material that is non-elastomeric (i.e., exhibits an elongation at yield of no greater than 50%). The mesh tube should not melt or thermally degrade under the conditions of the expansion step, at least until the foamable liquid mixture has partially expanded to a volume greater than that of the mesh tube. Among the suitable materials of construction are various organic polymers, such as polyolefins, polystyrene, various styrene copolymers, polyamides, polyesters, and the like, various natural fibers materials such as jute, hemp, cotton, linen, wool and the like, metals (typically in the form of perforated films or woven wires) and the like. Polyolefin mesh tubes, such as low density polyethylene (LDPE), high density polyolefin (HDPE), linear low density polyolefin (LLDPE) and other polyethylene copolymer mesh tubes, are entirely suitable. Polyethylene mesh materials that are useful as the mesh tube include those marketed by Polymer Molding Inc.

The foamable liquid mixture can be any material or mixture of materials that is initially liquid but which can be expanded to form a solid polymer foam. The foamable liquid mixture includes at least one blowing agent, by which is meant a material that forms a gas (by volatilizing or via some chemical reaction) under the conditions of the expansion step.

In some embodiments, the foamable liquid mixture contains polymer precursors that react during the expansion step to form the polymer. Such a mixture is sometimes referred to herein as a "reactive" mixture. Among the reactive mixtures of this type are polyurethane-forming compositions and epoxy resin/hardener mixtures, in each case including at least one material that generates a gas under the conditions of the expansion step. Polyurethane-forming compositions are preferred types.

A reactive mixture should react very soon after it introduced into the mesh tube, and in preferred embodiments is already beginning to react as the mesh tube is filled. The reaction builds viscosity and the increasing viscosity helps to prevent the foamable liquid mixture from flowing out of the openings in the mesh tube until it is forced out due to the expansion of the blowing agent. One measure of the reactivity of a reactive mixture is its cream time, which is the time required from when the components of the reactive mixture are brought together until a visible reaction is seen. The cream time preferably is no greater than 10 seconds, and more preferably no greater than 3 seconds, under the temperature conditions employed in the process. Another measure of the reactivity of the reactive mixture is its gel time. Gel time is preferably no greater than 60 seconds, more preferably no greater than 40 seconds and still more preferably no more than 25 seconds, under the temperature conditions employed in the process. Gel time and cream time can be evaluated according to ASTM D7487-08.

A reactive mixture is generally formed by bringing together the polymer precursors, typically in the presence of one or more catalysts, a blowing agent (if the reaction of the polymer precursors does not generate a blowing gas) and various optional components if desired, and then introducing the reactive mixture into the mesh tube as described. The polymer precursors may be heated to an elevated temperature, such as from 35 to 120° C. before bringing them together. Alternatively, or in addition, the reactive mixture may be heated before, during or after being introduced into the mesh tube. Because reactive mixtures with short gel times are preferred, it is preferred to transfer the reaction mixture into the mesh tube immediately or almost immediately (such as within 10 seconds, within 5 seconds or within 3 seconds) of bringing the polymer precursors together. A preferred way to doing this is to bring the polymer precursors (and additional blowing agent (if any), catalyst (if any), and other optional ingredients) together in a mixhead and to dispense the resulting reactive mixture from the mixhead into the mesh tube, or through an intermediate static mixing device into the mesh tube. The mixing and dispensing equipment should be equipped with means for controlling the volume of the dispensed reactive mixture.

Polyurethane-forming compositions are preferred foamable liquid mixtures because polyurethane-forming compositions can be easily formulated to provide short cream times and gel times. A polyurethane-forming composition suitable for use as the foamable liquid mixture includes at least one organic polyisocyanate compound and at least one isocyanate-reactive material that reacts at least difunctionally with isocyanate groups. If the isocyanate-reactive material does not include water, a blowing agent is also present, as described below. Expansion is achieved by subjecting the composition to conditions sufficient for the organic polyisocyanate compound and the isocyanate reactive material(s) to react to form the polymer. Polyurethane-forming compositions often will react and expand spontaneously upon mixing the polymer precursors (and any added blowing agents).

The polyurethane-forming composition is conveniently produced by mixing a liquid or molten organic polyisocyanate compound(s) with one or more liquid isocyanate-reactive materials, and then introducing the resulting liquid mixture into the mesh tube. A catalyst is typically present, as is a blowing agent if water is not included among the isocyanate-reactive materials. The mixing step can be performed by bringing the various components to a mixhead, such as an impingement mixer, and dispensing the resulting mixture into the mesh tube.

An advantage of a polyurethane-forming composition is that it often will expand and cure without the application of heat after it has been introduced into the mesh tube. Therefore, it is often unnecessary to apply heat to the composition after it has been introduced into the mesh tube in order to expand and cure it, and in preferred embodiments no external heating to a temperature greater than 50° C. is applied during step c) of the process. If some elevated temperature is needed, this often can be provided by preheating some or all of the components of the polyurethane-forming composition before mixing them and introducing the mixture into the mesh tube. However, it is within the scope of the invention to heat the composition after it has been introduced into the mesh tube to drive the expansion and cure.

Useful organic polyisocyanates contain an average of at least 1.5 and preferably at least 2.0 isocyanate groups per molecule. It may contain as many as 8 isocyanate groups per molecule, but typically contains no more than about 4 isocyanate groups per molecule. The organic polyisocyanate may contain as little as 0.5% by weight isocyanate groups, or may contain as much as about 50% by weight isocyanate groups. The isocyanate groups may be bonded to aromatic, aliphatic or cycloaliphatic carbon atoms. Examples of polyisocyanates include m-phenylene diisocyanate, tolulene-2,4-diisocyanate, tolulene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenyl-methane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophonate, uretonimine, isocyanurate, amide or like linkages. Examples of modified isocyanates of these types include various urethane group and/or urea group-containing prepolymers that have an isocyanate content of from about 0.5 to 20% by weight, as these prepolymers tend to have somewhat higher viscosities.

A wide range of isocyanate-reactive materials can be used to form the polymer through reaction with the organic polyisocyanate. A suitable isocyanate-reactive material contains at least two hydrogen atoms that are active according to the well-known Zerewitinoff active hydrogen determination test. Isocyanate-reactive groups that contain active hydrogen atoms include aliphatic primary or secondary hydroxyl groups, aromatic hydroxyl groups, aliphatic or aromatic primary or secondary amine groups, thiol (mercapto) groups, carboxylic acid groups, oxirane groups and the like. An isocyanate-reactive material should contain at least two of such isocyanate-reactive groups. The isocyanate-reactive groups on a particular isocyanate-reactive material may be all the same, or may be of two or more different types.

Water is considered to be an isocyanate-reactive material for purposes of this invention as it consumes two polyisocyanate molecules to produce a urea linkage, with elimination of a molecule of carbon dioxide. Water can be the only isocyanate-reactive material that is used, or can be used in combination with one or more additional isocyanate-reactive materials.

Another type of isocyanate-reactive material is a high equivalent weight isocyanate-reactive material that has a molecular weight of at least 250 per isocyanate-reactive group. Various types of high equivalent weight isocyanate-reactive materials are useful, including hydroxy-functional acrylate polymers and copolymers, hydroxy-functional polybutadiene polymers, polyether polyols, polyester polyols, amine-terminated polyethers, and various polyols that are based on vegetable oils or animal fats.

Another useful class of isocyanate reactive materials includes polyols, polyamines or aminoalcohols that contain at least two isocyanate-reactive groups per molecule and have a molecular weight per isocyanate-reactive group of up to 249, preferably from about 30 to about 200. These materials may have up to 8 or more isocyanate-reactive groups per molecule. Examples of isocyanate-reactive materials of this type include ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, poly(propylene oxide)diols of up to 249 equivalent weight, cyclohexanedimethanol, poly(ethylene oxide)diols of up to 249 equivalent weight, aminated poly(propylene oxide) diols of up to 249 equivalent weight, ethylene diamine, phenylene diamine, diphenylmethane diamine, bis(3-chloro-4-aminophenyl)methane and 2,4-diamino-3,5-diethyl toluene, diethanolamine, triethanolamine, di- or tri(isopropanol)amine, glycerine, trimethylol propane, pentaerythritol, various polyester polyols that have at least three hydroxyl groups per molecule and an equivalent weight of up to 249, and various low equivalent weight polyether polyols that have at least two hydroxyl groups per molecule.

It is preferred that the isocyanate-reactive materials include at least one compound that contains at least two isocyanate-reactive groups, at least one of which is a primary or secondary amino group, or a precursor to such a compound. Such primary or secondary amine compounds react very rapidly with polyisocyanates and thus form reactive mixtures that tend to have short cream and gel times. Among these amine compounds are polyethers that have terminal aliphatic or aromatic amino groups and a molecular weight from about 200 to 5000, and low molecular weight amine compounds as described above. Examples of such amine-terminated polyethers include the Jeffamine® aminated polyethers marked by Huntsman Chemicals.

Suitable precursors to such primary or second amine compounds include carbamates of an alkanolamine with carbon dioxide, such as are described, for example, in U.S. Pat. No. 4,735,970, U.S. Pat. No. 5,464,880, U.S. Pat. No. 5,587,117, U.S. Pat. No. 5,859,285 and WO 2007/040617. The alkanolamine may be, for example, N-methyl-2-aminoethanol, N-ethyl-2-aminoethanol, 2-(2-N-methyl-aminoethyl)-1,2-ethanediol, N,N'-bis(β-hydroxyethyl)-ethylene diamine, N,N'-bis(β-hydroxypropyl)ethylene diamine, N,N-bis(β-hydroxyethyl)-1,2-propylene diamine, N,N'-bis(β-hydroxypropyl)-1,3-propane diamine, N,N'-bis(β-hydroxyethyl)-1-methyl-2,4- and -2,6-diaminocyclohexane, N'N'-bis(β-hydroxypropyl)-p-xylylene diamine, N-(β-hydroxyethyl-N'-(β-hydroxypropyl) ethylene diamine, tris(β-hydroxyethyl)-1,6,11-triaminoundecane, 2-(2-aminoethoxy)ethanol and 2(2-(2-aminoethoxyl)ethoxy)ethanol.

The relative amounts of polyisocyanate and isocyanate-reactive materials are selected to produce a high molecular weight polymer. The ratio of these components is typically expressed as "isocyanate index" which for purposes of this invention means 100 times the ratio of isocyanate groups to isocyanate-reactive groups provided by the isocyanate-reactive materials. The isocyanate index is typically at least 50, and may be up to 1000 or more. The isocyanate index in some embodiments is from 70 to 150 or from 85 to 125.

The polyurethane-forming composition will contain a blowing agent. Water, which is an isocyanate-reactive material, functions as a blowing agent because it reacts with isocyanate groups to liberate carbon dioxide, which then serves a blowing gas. If the isocyanate-reactive materials include water, it may not be necessary to provide an additional blowing agent. However, other chemical and/or physical blowing agents can be used instead of or in addition to water. Chemical blowing agents react under the conditions of the expansion step to produce a gas, which is typically carbon dioxide or nitrogen. Various azo and carbamate compounds (including the carbamate compounds formed by adding carbon dioxide to an alkanolamine as described above) are useful chemical blowing agents. Physical blowing agents volatilize under the conditions of the polymer-forming step. Suitable physical blowing agents include various low-boiling chlorofluorocarbons, fluorocarbons, hydrocarbons and the like. Fluorocarbons and hydrocarbons having low or zero global warming and ozone-depletion potentials are preferred among the physical blowing agents.

A polyurethane-forming composition preferably will contain one or more surfactants. A surfactant can help to stabilize the cells of the composition as gas evolves to form bubbles. Examples of suitable surfactants include alkali metal and amine salts of fatty acids, such as sodium oleate, sodium stearate, diethanolamine oleate, diethanolamine stearate, diethanolamine ricinoleate and the like; alkali metal and amine salts of sulfonic acids such as dodecylbenzenesulfonic acid and dinaphthylmethanedisulfonic acid; ricinoleic acid; siloxane-oxyalkylene polymers or copolymers and other organopolysiloxanes; oxyethylated alkylphenols (such as Tergitol NP9 and Triton X100, from The Dow Chemical Company); oxyethylated fatty alcohols such as Tergitol 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 1 parts by weight based on 100 parts by weight of the polyols. Organosilicone surfactants are generally preferred types.

It is also possible (and generally preferred) to include one or more catalysts in a polyurethane-forming composition, including for example, one or more tertiary amine compounds, tertiary phosphine compounds; metal chelates of any of various metals, acidic metal salts of a strong acid, alcoholates or phenolates of various metals, alkaline earth metal, Bi, Pb, Sn or Al carboxylate salts; tetravalent tin compounds; and tri- or pentavalent bismuth, antimony or arsenic compounds. So-called reactive catalysts, which contain one or more isocyanate groups and so become bound into the polymer structure during the curing reaction, also are useful. Commercially available reactive catalysts include those marketed as Dabco type NE 300 and NE 1070 reactive amine catalysts).

Examples of specific polyurethane-forming compositions include those described in WO 2002/079340, WO 2005/090431, WO 2006/107342 and WO 2007/040617.

An epoxy resin composition suitable for use as the foamable liquid mixture includes at least one epoxy resin, at least one hardener, least one blowing agent and preferably at least one epoxy curing catalyst. Suitable epoxy resins, hardeners and epoxy curing agents are well known and are described, for example, in US 2010-0028651, incorporated herein by reference. If the admixture of these materials is not liquid at room temperature, it may be heated to melt it and/or be dissolved in some solvent to form a liquid for introduction into the mesh tube. Such a solvent may also function as a blowing agent. It is generally necessary to apply heat to an epoxy resin composition after it is introduced into the mesh tube in order to drive the expansion and cure.

The foamable liquid mixture may in other embodiments include a molten thermoplastic polymer, at least one blowing agent and optionally other ingredients such as crosslinkers and the like. In this case, a pressurized melt of the polymer and the blowing agent is formed, and the melt is injected into the mesh tube. The release of pressure when the melt is introduced into the mesh tube causes the blowing agent to expand rapidly while the polymer cools and hardens to produce the foam. The thermoplastic polymer in this case may be in some embodiments a polyolefin, especially an ethylene homopolymer or a copolymer of ethylene with an α-olefin, vinyl acetate, acrylic acid, an acrylic ester, styrene or other copolymerizable monomer. The polyolefin may be crosslinked. One way of crosslinking the polyolefin is heat it in the presence of a peroxy compound such as a peroxide, perester or percarbonate. The blowing agent may be a physical type or a chemical type (such as an azo blowing agent). Examples of expandable polyolefin compositions are described, for example, in U.S. Pat. No. 5,385,951, EP 452 527, EP 457 928, WO 01/30906, WO 07/117,663 and WO 117,664, all incorporated herein by reference.

The foamable liquid mixture may contain various optional ingredients in addition to those described before. These include, for example, curing agents, cell nucleating agents, crosslinkers, diluents, thixotropic agents, fillers, reinforcing agents (including fibers), preservatives, biocides, colorants, antioxidants, and the like.

The process of the invention is useful for filling pipes and a variety of tubular structures. The tubular structure may be a vehicle part or assembly. Examples of vehicular parts or assemblies that are conveniently filled in accordance with the invention include reinforcement tubes and channels, rocker panels, pillar cavities, rear tail lamp cavities, upper C-pillars, lower C-pillars, front load beams or other hollow parts. The structure may be composed of various materials, including metals (such as cold-rolled steel, galvanized surfaces, galvanel surfaces, galvalum, galfan and the like), ceramics, glass, thermoplastics, thermoset resins, painted surfaces and the like.

The following examples are provided to illustrate the invention, but are not intended to limit the scope thereof. All parts and percentages are by weight unless otherwise indicated.

EXAMPLE 1

A metal tube having a square cross-section (8 cm×8 cm, 64 $cm^2$ cross-sectional area) and a length of 40 cm is provided. The volume of the metal tube is 2560 $cm^3$. One side is removed to allow the process to be visually monitored. The metal tube is open at both ends. A length of tubular LDPE net (Polymer Molding Inc.) is knotted at one end to form a mesh tube 30 cm long with a diameter of 6 cm (about 28.25 $cm^2$ in cross-sectional area, about 847 $cm^3$ in volume). The holes in the netting are rhombic, about 4 mm on a side (about 0.16 $cm^2$ in area). The holes constitute approximately 90% of the surface area of the netting. The mesh tube is inserted into one end of the metal tube with the opening in the mesh tube positioned at that end of the tube.

A polyurethane structural foam formulation consisting of an isocyanate-terminated prepolymer and a mixture of isocyanate-reactive materials including a chemical blowing agent is processed through a high pressure impingement mixing machine. The prepolymer temperature before mixing is 45° C. and that of the isocyanate-reactive materials is 55° C. At these temperatures, this formulation has a cream time of less than 3 seconds and a gel time of less than 60 seconds. Output rate is set at 300 g/s. The pour head of the impingement mixing machine is attached to the open end of the mesh tube. 450 g of the structural foam formulation (enough to expand to a volume of about 2,240 $cm^3$) is introduced into the mesh tube. The structural foam formulation is entirely captured by and retained in the mesh tube. At this point, the mesh tube is only partially filled, but the formulation is already beginning to visibly react. The captured formulation then expands due to the exothermic reaction of its components. As it expands, the formulation fills the mesh tube. Part of the expanding formulation then flows through the holes in the mesh tube and into the remainder of the tube, where it makes contact with the sides of the tube and, upon completely curing, forms a polymer foam that is adherent to the sides of the tube. The polymer foam fills the entire tube except for a small portion at the end opposite of the end at which the foam formulation is introduced.

EXAMPLE 2

A metal tube having a square cross-section (7 cm×7 cm, 49 $cm^2$ cross-sectional area) and a length of 50 cm is provided. The volume of the tube is 2450 $cm^3$. The tube is open at one end. A mesh tube of tubular LDPE net (Polymer Molding Inc.) is inserted into one end of the metal tube. The mesh tube is 30 cm long and has a diameter of 6 cm (about 28.25 $cm^2$ in cross-sectional area, about 847 $cm^3$ in volume). The holes in the netting are about 4 mm in diameter (about 0.16 $cm^2$ in area). The holes constitute approximately 90% of the surface area of the netting. The mesh tube is open at both ends; in addition to the entrance, it has a distal hole about 28.25 $cm^2$ in area.

A polyurethane structural foam formulation is processed as described in Example 1. 965 g of the formulation is pumped through the entrance of the mesh tube. A portion of the structural foam formulation is captured by and retained in the mesh tube. Another portion passes out of the distal hole of the mesh tube and into the cavity. The formulation then expands due to the exothermic reaction of its components. As it expands, a portion of the formulation flows through the openings in the mesh tube and makes contact with the sides of the tube. Upon completely curing, the polymer foam fills the entire tube and is adherent to the sides of the tube. This sample is designated Example 2.

For comparison, a like cavity is filled in the same way, except no mesh tube is used. This sample is designated Comparative A.

Example 2 and Comparative A are subjected to thermal cycling as follows: The samples are brought to 23° C. and 30% RH (relative humidity). They are heated over 60 minutes to 80° C. and 80% RH, held at those conditions for 240 minutes, cooled over 120 minutes to −40° C. and 30% RH, held at those conditions for 240 minutes, and then heated over 60 minutes to 23° C. and 30% RH to complete one cycle. Twenty-four cycles are completed over 12 consecutive days. After the thermal cycling is completed, the metal tubes are cut open and the polymer foam is visually inspected for defects.

Comparative A exhibits large cracks that result from the thermal cycling. Example 2, however, shows no sign of cracking after the thermal cycling. The better performance of Example 2 is attributed to the presence of the mesh tube.

What is claimed is:

1. A method of providing a polymer foam within a hollow cavity, comprising:
    a) introducing a mesh tube at least partially into the cavity, the mesh tube being characterized in that (1) the volume of the mesh tube is smaller than the volume of the hollow cavity, (2) the mesh tube has an entrance for introducing an foamable liquid mixture containing at least one blowing agent and at least one organic polymer or organic polymer precursor into the mesh tube and (3) the mesh tube contains openings each having an area of from 0.01 $cm^2$ to 5 $cm^2$, which openings in the aggregate constitute at least 50% of the surface area of that portion of the mesh tube within the cavity;
    b) then at least partially filling the mesh tube with the foamable liquid mixture, and then
    c) expanding the foamable liquid mixture such that the foamable liquid mixture expands and upon expansion at least a portion of the foamable liquid mixture flows through at least some of the openings in the mesh tube and into the hollow cavity and forms a polymeric foam adherent to at least one internal surface of the hollow cavity.

2. The method of claim 1 wherein the mesh tube has a smaller cross-sectional area than the cavity.

3. The method of claim 1 wherein the mesh tube is shorter than the cavity.

4. The method of claim 1, wherein in step b), the initial volume of the foamable liquid mixture is smaller than that of the mesh tube, and the foamable liquid mixture is substantially captured by the mesh tube such that a portion of the hollow cavity remains unfilled after step b) is completed and prior to the expansion of the foamable liquid mixture in step c).

5. The method of claim 4, wherein the initial volume of the foamable liquid mixture is up to 50% of the volume of the mesh tube.

6. The method of claim 1, wherein in step c) the foamable liquid mixture expands to about 150 to 500% of its original volume.

7. The method of claim 1, wherein in step c) the foamable liquid mixture expands to about 500 to 2000% of its original volume.

8. The method of claim 1, wherein the polymeric foam has a density of from 16 to 160 kg/m$^3$.

9. The method of claim 1, wherein the polymeric foam has a density of from 160 to 540 kg/m$^3$.

10. The method of claim 1, wherein the foamable liquid mixture contains polymer precursors that react during step c) to form the polymer.

11. The method of claim 10, wherein the foamable liquid mixture has a cream time of no greater than 10 seconds.

12. The method of claim 11, wherein the foamable liquid mixture is formed by bringing the polymer precursors together in the presence of a catalyst and a blowing agent if the polymer precursors do not react to generate a blowing gas, and the foamable liquid mixture is introduced into the mesh tube within 5 seconds of bringing the polymer precursors together.

13. The method of claim 10, wherein the foamable liquid mixture is a polyurethane-forming composition.

14. The method of claim 13, wherein no external heating to a temperature greater than 50° C. is applied during step c).

15. A method of providing a polymer foam within a hollow cavity, comprising:
  a) introducing a mesh tube into the cavity, the mesh tube being characterized in that (1) the volume of the mesh tube is smaller than the volume of the hollow cavity, (2) the mesh tube has an entrance for introducing an foamable liquid mixture containing at least one blowing agent and at least one organic polymer or organic polymer precursor into the mesh tube and (3) the mesh tube contains openings each having an area of from 0.01 cm$^2$ to 5 cm$^2$, which openings in the aggregate constitute at least 50% of the surface area of the mesh tube;
  b) then at least partially filling the mesh tube with a volume of the foamable liquid mixture equal to or less than the volume of the mesh tube such that the foamable liquid mixture is substantially captured by the mesh tube and at least a portion of the hollow cavity remains unfilled, and then
  c) expanding the foamable liquid mixture such that the foamable liquid mixture expands and upon expansion at least a portion of the foamable liquid mixture flows through at least some of the openings in the mesh tube and into the hollow cavity and forms a polymeric foam adherent to at least one internal surface of the hollow cavity.

* * * * *